D. MATER, Jr.

Improvement in Combined Fork and Pick.

No. 130,517.

Patented Aug. 13, 1872

Witnesses:
P. C. Dieterich
Gustave Dieterich

Inventor:
D. Mater Jr.
per Munn & Co.
Attorneys.

UNITED STATES PATENT OFFICE.

DANIEL MATER, JR., OF BELLMORE, INDIANA, ASSIGNOR TO HIMSELF AND IRA MATER, OF SAME PLACE.

IMPROVEMENT IN COMBINED FORKS AND PICKS.

Specification forming part of Letters Patent No. 130,517, dated August 13, 1872.

*To all whom it may concern:*

Be it known that I, DANIEL MATER, Jr., of Bellmore, in the county of Parke and State of Indiana, have invented a new and useful Improvement in Agricultural Implements; and I do hereby declare that the following is a full, clear, and exact description thereof, which will enable others skilled in the art to make and use the same, reference being had to the accompanying drawing forming part of this specification.

This invention relates to a new and useful improvement in an implement for use on farms and in gardens; and it consists in a combined four-tined fork and spear-head hoe or pick arranged on a handle so that the fork may be converted into a forked spade, as will hereinafter be more fully described.

Figure 1:
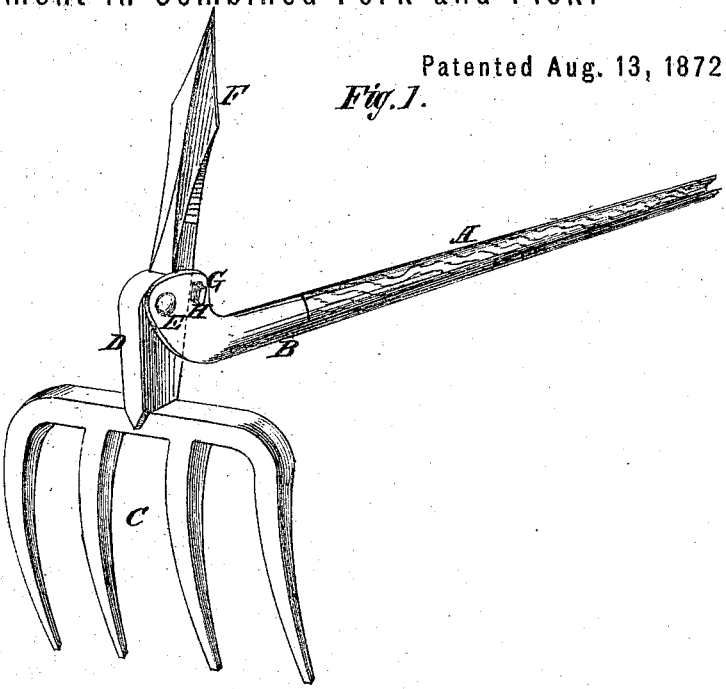
Figure 2:
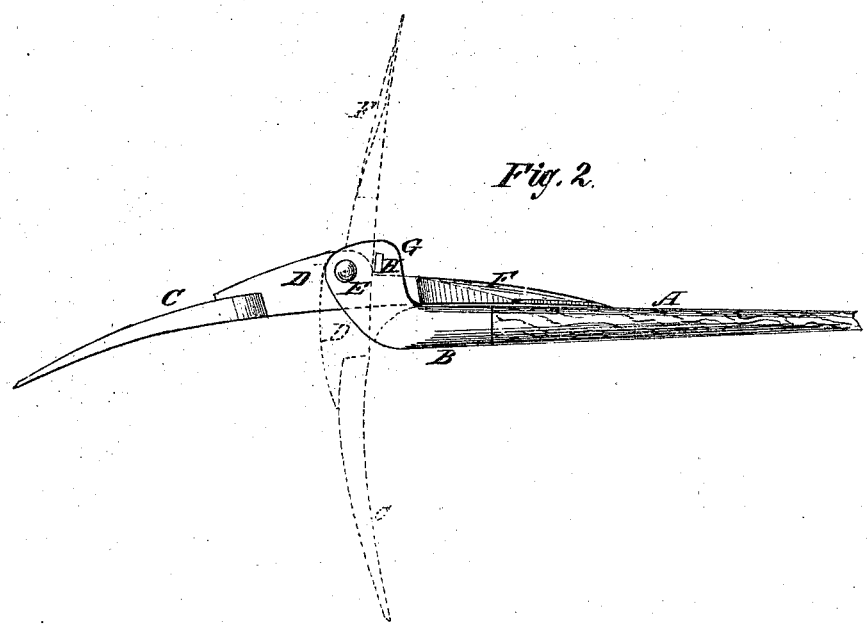

In the accompanying drawing, Figure 1 represents the article as ready for use as a fork-hoe. Fig. 2 shows the blade folded up so that the fork may be used as a spade.

Similar letters of reference indicate corresponding parts.

A is the handle. B is the forked socket on the end of the handle. C is the four-tined fork, the shank D of which is attached to the socket B by the pivot-pin E. The shank D is extended, and is formed into a spear-head hoe, F. The socket D is arranged so that the forked portion G stands at near a right angle with the handle, and when the spear-head hoe is folded down, as seen in Fig. 2, its face is parallel with the handle, and the fork C is in a position to use as a spade. H is a key which passes through the part G of the socket which serves to keep the hoe-blade in place. This key performs the same office when the fork and the hoe-blade are in the other position as seen in Fig. 1.

This is a most convenient implement for the garden in loosening the soil or handling manure, and for various other purposes, one implement being adapted for various operations in the garden and on the farm.

Having thus described my invention, I claim as new and desire to secure by Letters Patent—

The bifurcated handle-head B, constructed as described, and the socket D, constructed as set forth, and combined with the pivot-pin E and key G, and arranged with the fork C and spade F, so that the tool can be held in two positions, substantially as specified.

DANIEL MATER, JR.

Witnesses:
JOHN D. HUNT,
DAVID STROUSE.